US012556508B2

(12) United States Patent
Gupta et al.

(10) Patent No.: US 12,556,508 B2
(45) Date of Patent: Feb. 17, 2026

(54) DETECTION AND SOLUTION OF MISDIRECTED DOMAIN NAME SYSTEM REQUESTS

(71) Applicant: Ruckus IP Holdings LLC, Claremont, NC (US)

(72) Inventors: Shailesh Gupta, Bengalaru (IN); Mayank Sourabh, Bengaluru (IN)

(73) Assignee: Ruckus IP Holdings LLC, Horsham, PA (US)

( * ) Notice: Subject to any disclaimer, the term of this patent is extended or adjusted under 35 U.S.C. 154(b) by 158 days.

(21) Appl. No.: 18/602,231

(22) Filed: Mar. 12, 2024

(65) Prior Publication Data

US 2024/0314103 A1    Sep. 19, 2024

Related U.S. Application Data

(60) Provisional application No. 63/452,004, filed on Mar. 14, 2023.

(51) Int. Cl.
*H04L 61/4511* (2022.01)
*H04L 61/5014* (2022.01)
*H04L 61/5046* (2022.01)

(52) U.S. Cl.
CPC ...... *H04L 61/4511* (2022.05); *H04L 61/5014* (2022.05); *H04L 61/5046* (2022.05)

(58) Field of Classification Search
CPC ............. H04L 61/4511; H04L 61/5014; H04L 61/5046
See application file for complete search history.

(56) References Cited

U.S. PATENT DOCUMENTS

| 10,326,730 | B2 * | 6/2019 | Gautam | H04L 61/4511 |
| 2011/0295940 | A1 * | 12/2011 | Saleem | H04L 61/4511 709/203 |
| 2013/0151725 | A1 * | 6/2013 | Baginski | H04L 61/4511 709/245 |
| 2013/0254425 | A1 * | 9/2013 | Broerman | H04L 61/4511 709/238 |

(Continued)

FOREIGN PATENT DOCUMENTS

| CN | 104144123 A | * 11/2014 | |
| CN | 105554170 A | * 5/2016 | H04L 61/4511 |

(Continued)

*Primary Examiner* — Richard G Keehn
(74) *Attorney, Agent, or Firm* — Myers Bigel, P.A.

(57) ABSTRACT

Methods, systems, and devices in which a computer networking device may compare the destination address of the a name resolution request with a stored list of addresses. If the destination address does not match any of the addresses from the stored list, the computer networking device may perform one or more actions, such as sending a notification, redirecting the name resolution request to one of the servers in the list, or generating a new name resolution request. For example, a method may include receiving network traffic from a client device including a first name resolution request; comparing a first destination address from the first name resolution request with a list of addresses indicating servers to which the client device is to communicate name resolution requests; and detecting that the first destination address does not match any of the addresses from the list of addresses.

20 Claims, 9 Drawing Sheets

(56) References Cited

U.S. PATENT DOCUMENTS

| | | | | |
|---|---|---|---|---|
| 2013/0262637 A1* | 10/2013 | Weaver | ............... | H04L 61/4511 |
| | | | | 709/245 |
| 2015/0040173 A1* | 2/2015 | Panagos | .............. | H04L 61/5007 |
| | | | | 725/116 |
| 2016/0337313 A1* | 11/2016 | Wood | ................... | H04L 61/4511 |
| 2018/0103409 A1* | 4/2018 | Pawar | ................ | H04L 61/4511 |
| 2020/0076766 A1* | 3/2020 | Maslak | ............... | H04L 61/4511 |
| 2023/0362127 A1* | 11/2023 | Korja | .................. | H04L 61/4511 |
| 2024/0089186 A1* | 3/2024 | Nandi | ................... | H04L 61/103 |
| 2024/0154935 A1* | 5/2024 | Szilágyi | .............. | H04L 61/4511 |
| 2025/0220076 A1* | 7/2025 | Yu | ...................... | H04L 61/4511 |

FOREIGN PATENT DOCUMENTS

| | | | | | |
|---|---|---|---|---|---|
| CN | 104144123 B | * | 6/2017 | | |
| CN | 109150561 A | * | 1/2019 | .......... | H04L 61/4511 |
| CN | 109246256 A | * | 1/2019 | .......... | H04L 61/4511 |
| CN | 105554170 B | * | 6/2019 | .......... | H04L 61/4511 |
| CN | 110769004 A | * | 2/2020 | ......... | H04L 63/0236 |

* cited by examiner

FIG. 9

DETECTION AND SOLUTION OF MISDIRECTED DOMAIN NAME SYSTEM REQUESTS

CROSS-REFERENCE TO RELATED APPLICATION

The present application claims the benefit of priority to U.S. Provisional Application No. 63/452,004, filed on Mar. 14, 2023, and the entire contents of the above-identified application are incorporated by reference as if set forth herein.

TECHNICAL FIELD

The present disclosure relates to networks of computer devices and to computer networking devices (e.g., access points, switches), and in particular relates to methods, systems, and devices providing detection and solution of misdirected domain name system requests, for example from misconfigured client devices.

BACKGROUND

It is desirable that operators of computer networks provide a smooth and relatively frustration-free experience for users accessing the network. Although there are numerous systems and protocols that help in providing such experiences, two of relative importance are Dynamic Host Configuration Protocol (DHCP) and Domain Name System (DNS).

DHCP is a network protocol used to provide dynamic Internet Protocol (IP) addresses to devices on a network. Once obtained, the IP address uniquely identifies the device on the network. DHCP is used to assign IP addresses automatically to client devices (herein "clients"), eliminating the need for manual address configuration. DHCP works by assigning a lease of an IP address from a pool of available IP addresses to a requesting device. This lease is valid for a certain period of time, and the device must renew its lease before it expires. DHCP also provides additional features, such as automatic renewal of IP address leases and network troubleshooting capabilities.

DNS is a distributed system that translates human-readable domain names (e.g. example.com) into computer-readable numerical IP addresses (e.g., 123.45.67.89). DNS is also used to provide other information such as mail server locations. When a user attempts to access a network resource (either on a local network or a wide-area network, such as the Internet), the networked device of the user may contact a DNS server in an attempt to translate (or resolve) the provided domain name into a numerical IP address. In greater detail, DNS is composed of a hierarchy of name servers, which includes a root server, top-level domain (TLD) servers, and authoritative name servers that store records providing information about domain names (including IP addresses). When an attempt is made to access a network resource, a networked device will typically contact a recursive DNS server, which will in turn consult the hierarchy of name servers in an attempt to determine the associated IP address. Recursive DNS servers typically use caching to store recently accessed domain names and their associated IP addresses, allowing for faster resolution of domain names to associated IP addresses.

Recursive DNS service is typically provided by an Internet Service Provider (ISP), although many organizations of various sizes may deploy local recursive DNS servers to process locally-originated DNS requests more quickly, provide resolution of private network resources, monitor and filter website requests, as well as for other reasons. Some organizations provide public DNS resolution services (either as a free or paid service), such as OPENDNS or GOOGLE Public DNS, and some users may configure their devices to use these services.

Most users, however, do not wish to configure network settings. Accordingly, DHCP and DNS systems have an overlap. A DHCP server can be configured to provide a listing of DNS servers as part of the process in which a client device obtains an IP address. Specifically, DHCP Option 6 provides a framework for passing DNS server IP addresses to client devices on a network. This may help a client device by providing an address of a DNS server to which the client device can direct DNS requests, and thereby quickly connect to local resources and/or the Internet with minimal user configuration and involvement.

SUMMARY

According to some embodiments of the present inventive concepts, a method may include: identifying, by a computer networking device, a message confirming that a network address is assigned to a client device communicatively coupled with the computer networking device; extracting, from the message, a list of addresses indicating servers to which the client device is to communicate name resolution requests; storing the list of addresses; receiving subsequent network traffic from the client device including a name resolution request; comparing a destination address from the name resolution request with the list of addresses; and performing, by the computer networking device, one or more actions when the destination address does not match any of the addresses from the list of addresses.

According to some embodiments of the present inventive concepts, a method may include: identifying, by a first computer networking device, a message confirming that a network address is assigned to a client device communicatively coupled with the first computer networking device; extracting, from the message, a list of addresses indicating servers to which the client device is to communicate name resolution requests; transmitting the list of addresses from the first computer networking device to a controller; receiving, at a second computer networking device, subsequent network traffic from the client device including a name resolution request; transmitting the list of addresses from the controller to the second computer networking device; comparing, by the second computer networking device, a destination address from the name resolution request with the list of addresses; and performing, by the second computer networking device, one or more actions when the destination address does not match any of the addresses from the list of addresses.

According to some embodiments of the present inventive concepts, a method may include: receiving, by a computer networking device, network traffic from a client device including a first name resolution request; comparing a first destination address from the first name resolution request with a list of addresses indicating servers to which the client device is to communicate name resolution requests; detecting that the first destination address from the first name resolution request does not match any of the addresses from the list of addresses; extracting a domain name to be resolved from the first name resolution request; and generating a second name resolution request comprising the domain name to be resolved and a second destination address that matches one of the addresses of the list of addresses.

The present disclosure is not limited to the above-described examples of embodiments and inventive concepts, and the above and other embodiments and inventive concepts are provided in greater detail herein.

BRIEF DESCRIPTION OF THE DRAWINGS

Note that like reference numerals refer to corresponding parts throughout the drawings. Moreover, multiple instances of the same part may be designated by a common prefix separated from an instance number by a dash.

DETAILED DESCRIPTION

Client devices are increasingly mobile, and it is now commonplace for smartphones, laptops, tablets, and other devices to connect with multiple different networks daily, weekly, and so on. When a client device connects to a first network (for the first time or in a subsequent reconnection process), it typically first obtains an IP address (a first IP address) for use on the first network from a DHCP server providing DHCP service to the first network. Later, when the device transitions to a second network, it again obtains an IP address (a second IP address) for use on the second network from a DHCP server providing DHCP service to the second network.

Figure 1:
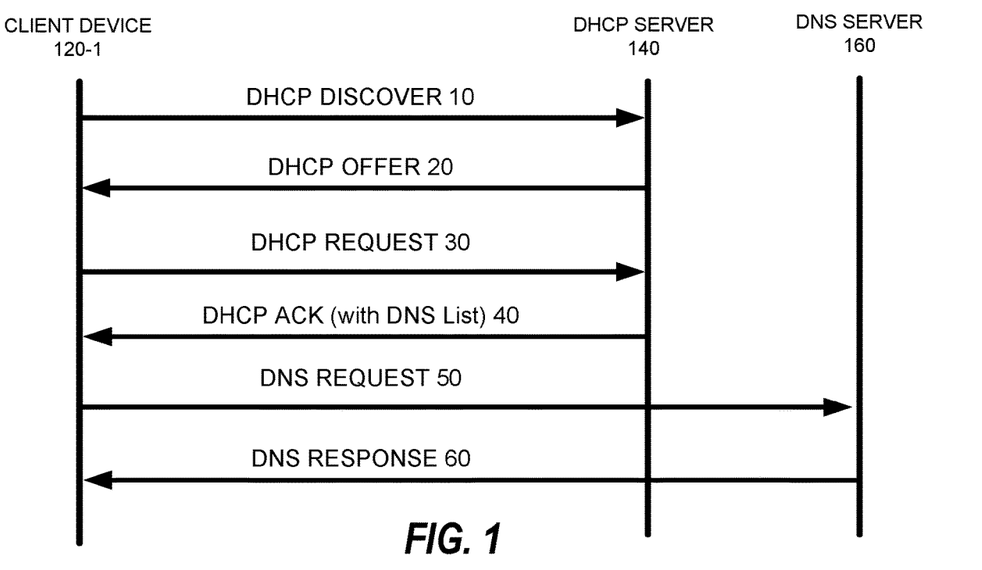
FIG. 1 is a communication diagram providing an explanation of an ideal case of communication between a client device, a DHCP server, and a DNS server.

Obtaining an IP address from a DHCP is typically a four-operation process, illustrated in FIG. 1, which is a communication diagram providing an explanation of an ideal case of communication between a client device, a DHCP server, and a DNS server. First, a client device 120-1 broadcasts a DHCP Discover message 10 on the network to locate available DHCP servers. This message includes the Media Access Control (MAC) address of the client device 120-1, and is sent to a DHCP broadcast IP address (e.g., 255.255.255.255). A DHCP server 140 may listen for DHCP broadcast messages and receive the DHCP Discover message 10. The DHCP server 140 responds to the DHCP Discover message 10 by sending a DHCP Offer message 20 to the client device 120-1. This message includes a potential IP address, subnet mask, and lease duration for the client device 120-1. Configuration information, including the IP address of the DHCP server 140, a subnet mask, a default gateway, and so on, may also be provided in the DHCP Offer message.

After receiving the DHCP Offer message, the client device 120-1 may send to the DHCP server 140 a DHCP Request message 30. The DHCP Request message 30 may specifically request the offered IP address, subnet mask, and lease duration. The DHCP server 140 may respond to the DHCP Request message 30 by sending a DHCP ACK (e.g., DHCP acknowledgement) message 40. This DHCP ACK message 40 confirms that the IP address has been assigned to the client device 120-1 and may include other information, such as the lease duration.

As part of the DHCP ACK message 40, the DHCP server 140 can be configured to provide a listing of IP addresses of DNS servers, such as DNS server 160. As discussed above, this may help the client device 120-1 by providing a location to which the client device can direct DNS requests 50 and receive DNS responses 60, and thereby quickly enable the client device 120-1 to connect to local resources and/or the Internet.

Different networks (for example, a home network and a work network) may use different DNS servers, which in some instances may not be accessible from other networks. For example, when a client device 120-1 is connected to a home network, the client device 120-1 may contact and use a first DNS server provided by the home ISP. The same client device 120-1 may then travel from the home network to a network at an office and connect to a corporate network, and then contact and use a second DNS server available on the corporate network. In some instances, the client device 120-1 may not physically move, and may instead switch from the home network to the corporate network via a connection mechanism such as a Virtual Private Network (VPN). As another example, the client device 120-1 may switch from a first network (wired or wireless) to a second network (wired or wireless).

Regardless of whether the client device 120-1 moves physically from a first location serviced by a first computer networking device to a second location serviced by a different computer networking device, or switches to a new network, the client device 120-1 may need to obtain an IP address for the new (second) network. The client device 120-1 may attempt to contact the local DHCP server using the process discussed above with respect to FIG. 1 and either obtain a new lease for a new IP address for the new (second) network, or confirm that a lease and/or previously used IP address is still reserved or available for the client device 120-1 on the new (second) network.

The present disclosure is based in part on the recognition that client devices 120-1 may become misconfigured with respect to locally available DNS servers. For example, in some situations, especially where reconnecting or rejoining a known network while the client device holds a still-valid lease of an IP address on the network being rejoined, the client device 120-1 may not contact the DHCP server, and may not receive a DHCP ACK message that includes a list of locally accessible DNS servers on the network being rejoined by the client device 120-1. In other situations, the client device 120-1 may receive a DHCP ACK message that includes a list of locally accessible DNS servers on the new network but may disregard the list of DNS addresses provided therein. In some situations, the client device may not switch to using a locally accessible DNS servers and instead use a previously-identified DNS server.

Figure 2:
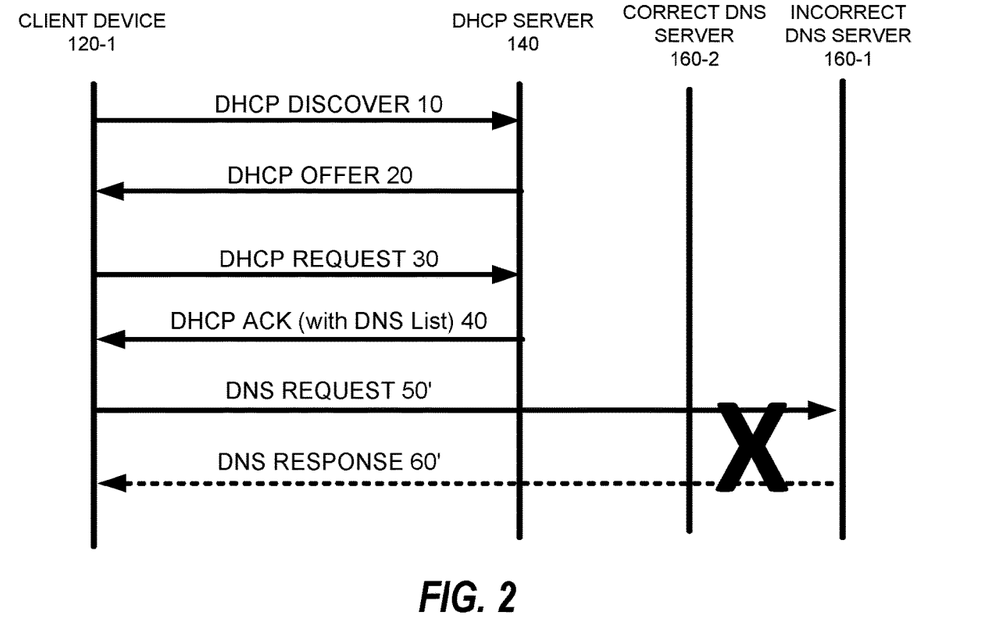
FIG. 2 is a communication diagram providing an explanation of a problematic situation in which communication between a client device and a desired DNS server can be impacted because of misconfiguration of the client device.

FIG. 2 is a communication diagram providing an explanation of a problematic situation in which communication between a client device 120-1 and a desired DNS server (here new DNS server 160-2) can be impacted because of misconfiguration of the client device 120-1. As seen, the client device 120-1 and DHCP server 140 may exchange DHCP Discover, DHCP Offer, and DHCP Request messages 10, 20, and 30 as discussed above with respect to FIG. 1. The DHCP server 140 may communicate the DHCP ACK message 40 with the list of DNS servers such as correct DNS server 160-2. However, the client device 120-1 may not properly store or process the DHCP ACK message 40 and may not use or switch to using the correct DNS server 160-2. Instead, the client device 120-1 may use or attempt to use a previously configured (or incorrect) DNS server 160-1. As a result, DNS request 50' may be sent to the incorrect DNS server 160-1, and either an incorrect DNS response 60' may be received or, when incorrect DNS server 160-1 is not available via the network, no DNS response 60 may be received by the client device 120-1. FIG. 2 is merely one example, and misconfiguration of the client device 120-1 may arise in a variety of situations that result in the client device 120-1 not using the correct DNS server 160-2 and instead using or attempting to use the incorrect DNS server 160-1.

Pursuant to the inventive concepts of the present disclosure, a computer networking device, such as an access point or a switch, that is on the network and provides network service or access to the client device 120-1 may identify a DHCP ACK message 40 that is being communicated to the client device 120-1 via the computer networking device. The computer networking device may extract from the DHCP ACK message 40 a list of DNS servers and store the list of DNS servers in association with the client device 120-1. When a later DNS request is received from the client device 120-1, the computer networking device may compare the destination address of the DNS request with the stored list of DNS servers. If the destination address of the DNS request does not match the stored list of the DNS servers (which may indicate a misconfiguration of the client device 120-1), the computer networking device may perform one or more actions, such as sending a notification, redirecting the request to one of the DNS servers in the list, or generating a new DNS request having a destination address that matches one of the DNS servers in the list.

Providing the detection and action mechanism discussed above may assist a client device 120-1 (and a user thereof) by correcting a misconfiguration of the client device in a manner that does not significantly impact the client device. For example, the misconfiguration of the client device may be handled in a relatively seamless or automatic way by the computer networking device, resulting in increased network efficiency (as improper or misdirected DNS requests that use network resources are not communicated). Overall, technical performance of the network and of the computer networking devices may improve, as network resources are not used to service improper or unfulfillable DNS requests. Furthermore, a user and/or client device may experience more rapid connectivity to desired network locations even in a situation where the client device is misconfigured, as address resolution is performed by a DNS server that is available and intended for use by the client device.

Figure 3:
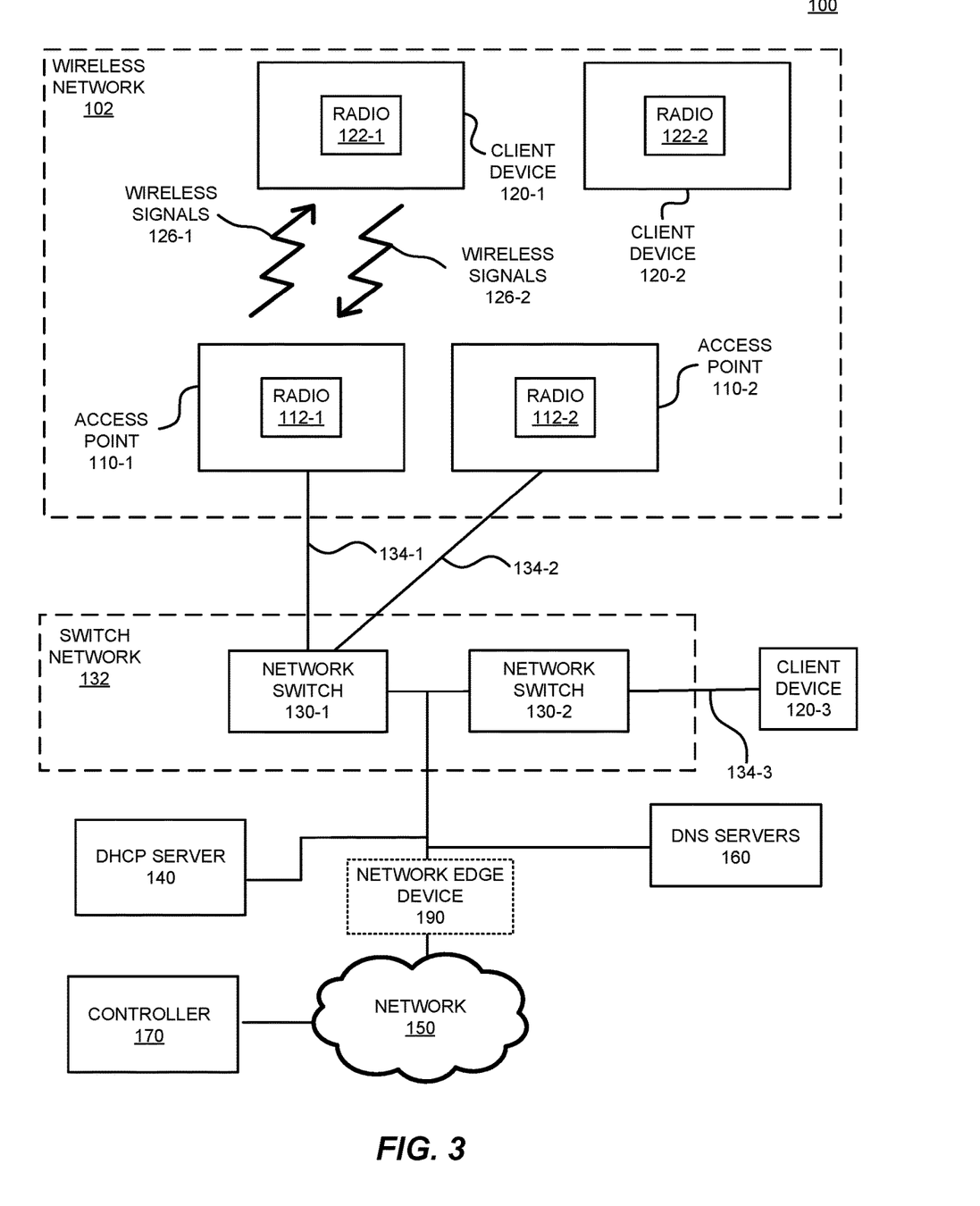
FIG. 3 is a block diagram illustrating electronic devices and computer networking devices in a network according to some embodiments of the present disclosure.

FIG. 3 is a block diagram illustrating electronic devices and computer networking devices in a network 100 according to some embodiments of the present disclosure. In the network 100, one or more access points 110 may communicate with client devices 120 in a wireless network 102, which may be a wireless local area network (WLAN). The access points 110 may be serviced by a switch network 132 that includes one or more network switches and/or routers 130, which may facilitate access to a network (e.g., an external network) 150. The access points 110 and network switches and/or routers may be referred to herein collectively as computer networking devices 110/130. The network 100 may also include other computer networking devices (not shown) such as data planes or the like.

The access points 110 may communicate using wireless and/or wired communication (such as by using Ethernet or a communication protocol that is compatible with Ethernet) with the client devices 120. Herein, wireless communication may include communication of packets or frames in accordance with a wireless communication protocol, such as an Institute of Electrical and Electronics Engineers (IEEE) 802.11 standard (sometimes referred to as 'WiFi'. In the discussion that follows, WiFi is used as an illustrative example. For example, an IEEE 802.11 standard may include one or more of: IEEE 802.11a, IEEE 802.11b, IEEE 802.11g, IEEE 802.11-2007, IEEE 802.11n, IEEE 802.11-2012, IEEE 802.11-2016, IEEE 802.11ac, IEEE 802.11ax, IEEE 802.11ba, IEEE 802.11be, or other present or future developed IEEE 802.11 technologies. Other wireless interfaces and/or protocols may be used, such as Bluetooth, and unless stated otherwise, the present disclosure is not limited to a particular wireless communication standard, interface, or protocol.

In some embodiments, the access points 110 may include physical access points and/or virtual access points that are implemented in software in an environment of an electronic device or a computer. In some embodiments, the access points 110 may communicate with each other via wired or wireless connections (e.g., via the switch network 132 or via wireless signals 126). The wired and/or wireless communication among access points 110 in wireless network 102 may occur via a network (such as an intra-net, a mesh network, point-to-point connections and/or the Internet) and may use a network communication protocol, such as Ethernet. In some embodiments, the access points 110 may be arranged in a mesh configuration, such as where a direct wired or wireless connection between an access point 110 and a network switch 130 of the switch network 132 is absent, and the access point 110 instead communicates indirectly with the switch network 132 and/or the network 150 via an intermediate access point 110.

As can be seen in FIG. 3, wireless signals 126-1 (represented by a jagged line) are transmitted from a radio 112-1 in access point 110-1. These wireless signals may be received by radio 122-1 in a client device 120-1. Wireless signals 126-2 (represented by a jagged line) are transmitted from the radio 122-1 in the client device 120-1. These wireless signals may be received by the radio 112-1 in the access point 110-1. Each of the radios 112 and 122 may be configured to generate and/or receive radio frequency signals in one or more wireless communication frequency bands (e.g., the 2.4 GHz frequency band, the 5 GHz frequency band, the 6 GHz frequency band, and so on).

Although only one radio 112/122 is shown in each of the access points 110 and client devices 120, it may be understood that in some embodiments multiple radios 112/122 may be present, each configured to generate and/or receive signals in different frequency bands.

Each of the client devices 120 may be, for example, any network-capable electronic device, including (as non-limiting examples) a desktop computer, a laptop computer, a subnotebook/netbook, a server, a computer, a mainframe computer, a cloud-based computer, a tablet computer, a smartphone, a cellular telephone, a smartwatch, a wearable device, a consumer-electronic device, a portable computing device, an access point, a transceiver, a controller, a radio node, a router, a switch, communication equipment, a wireless dongle, test equipment, and/or another electronic device. As seen in FIG. 3, some client devices 120 (e.g., client device 120-3) may not be part of the wireless network 102, and may instead be directly coupled with a network switch 130 of the switch network 132.

The switch network 132 may include one or more network switches and/or routers 130. In some embodiments, the one or more network switches and/or routers 130 may include a stack of multiple switches or routers (which are sometimes referred to as 'stacking units'). As an example, a network switch 130-1 may include a number of communication interfaces or ports (not shown) in communication with one or more electronic devices. During operation, a first of the communication interfaces may receive a packet or other data container from a first electronic device (e.g., a client device 120, an access point 110, another networking switch 130). The packet may then be processed and forwarded to a second port associated with a second electronic device. The network switch and/or router 130 may be a layer-2 or layer-3 network switch or router. The switch network 132, and the network switches 130 thereof, may be coupled to access points 110 of the wireless network 102 via wired links 134.

The controller 170 may be configured to perform configuration operations and/or management operations that control functionality of the computer networking devices 110/130. For example, the controller 170 may define flow definitions comprising packet processing rules and corresponding actions and promulgate these rules to the network switches 130 of the switch network 132. As another example, the controller 170 may manage the access points 110, for example by providing various configuration information, controlling settings, routing information, authorization/authentication information, or the like. The controller 170 may communicate with the access point 110 and/or network switches 130 via one or more logical links (not shown in FIG. 3), which in some embodiments may at least partially overlap the wired links 134. The controller 170 may be configured to offer a single user interface accessible via a web browser, command prompt, or the like, via which control commands may be entered.

In some embodiments, the controller 170 may be connected via physical links with one or more of the access points 110 or the network switches 130 (and may be part of the switch network 132). In some embodiments, the controller 170 may be one of the network switches 130. In some embodiments, the controller 170 may be a cloud-based controller 170 that may be operating at a location relatively remote from the switch network 132 and the network switches 130 thereof. The cloud-based controller 170 may communicate with the network switches 130 via a network, such as network 150.

The network 150 may be a layer-2 or layer-3 network, and may include one or more local area networks (LANs), campus area networks (CANs), wide area networks (WANs), metropolitan area networks (MANs), and/or the Internet. The network 150 may be separated from the switch network 132 by a network edge device 190, which may monitor network traffic that is incoming to and outgoing from the switch network 132 and decide whether to permit or prohibit various traffic based on one or more security rules. For example, the network edge device 190 may be or may include a firewall.

A DHCP server 140 may provide dynamic IP addresses to the devices (e.g., the client devices 120 and the computer networking devices 110/130) connected to the wireless network 102 and/or the switch network 132. The IP addresses uniquely identify the devices 110, 120, 130 on the network 102/132. One or more DNS servers 160 may receive DNS requests from devices (e.g., the client devices 120) that include a request for translation or resolution of a domain name, and may provide DNS responses including one or more IP addresses that are mapped to the provided domain name. In some embodiments, the DNS servers 160 may be a recursive DNS server, and may include a cache.

As described further below with reference to FIG. 9, the one or more computer networking devices 110/130 (e.g., access points 110, network switches 130), client devices 120, controller 170, network edge device 190, DHCP server 140 and/or DNS server 160 may include subsystems, such as a networking subsystem, a memory subsystem and a processor subsystem. More generally, the access points 110, network switches 130, and/or client devices 120 can include (or can be included within) any electronic devices with the networking subsystems that enable the access points 110, network switches 130, and/or client devices 120 to communicate with each other using wireless and/or wired communication.

Figure 4:
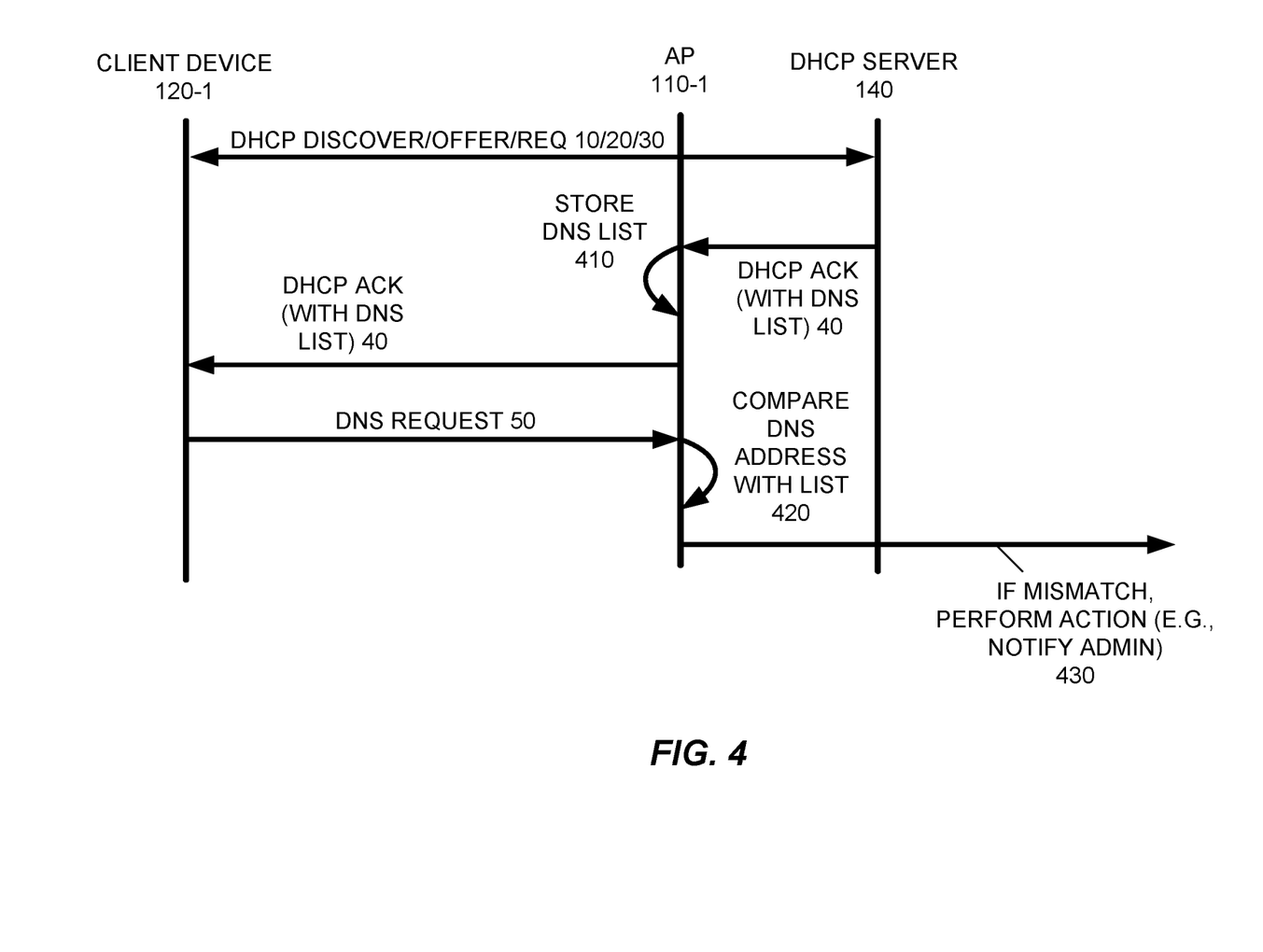
FIG. 4 is a communication diagram providing an example embodiment according to the present disclosure in which communication between a client device and an incorrect DNS server can be identified.

FIG. 4 is a communication diagram providing an example embodiment according to the present disclosure in which communication between a client device and an incorrect DNS server can be identified. Pursuant to the inventive concepts of the present disclosure, a computer networking device, such as a switch 130 or an access point 110, that is on a network 102/132 and provides network service or access to the client device 120-1 may identify a DHCP ACK message 40 that is being communicated to the client device 120-1 via the computer networking device. Example embodiments of the inventive concepts provided herein employ a first access point 110-1 and a second access point 110-2 as examples of computer networking devices that are configured to perform the detection and action operations described herein, but as discussed above, in other embodiments the computer networking devices may include switches 130 (e.g., a first switch 130-1 and a second switch 130-2) or other computer networking devices.

Since the client device 120-1 communicates with the wireless network 102 via the access point 110-1 (and/or via the wired network 132 via the switch 130), the access point 110-1 may be between the client device 120-1 and the DHCP server 140 and receive the messages exchanged by the client device 120-1 and the DHCP server 140. Accordingly, the access point 110-1 may identify a DHCP ACK message 40 that is being communicated to the client device 120-1 via the access point 110-1. The access point 110-1 may examine the contents of the DHCP ACK message 40 and extract from the DHCP ACK message 40 a list of DNS servers, if present.

The access point 110-1 may then store the list of DNS servers in association with the client device 120-1 (operation 410 of FIG. 4).

When a later DNS request 50 is received from the client device 120-1, the access point 110-1 may compare the destination address of the DNS request with the stored list of DNS servers (operation 420 of FIG. 4). If the destination address of the DNS request 50 does not match the stored list of the DNS servers, the access point 110-1 may perform one or more actions (operation 430 of FIG. 4), such as sending a notification to an administrative user.

Figure 5:
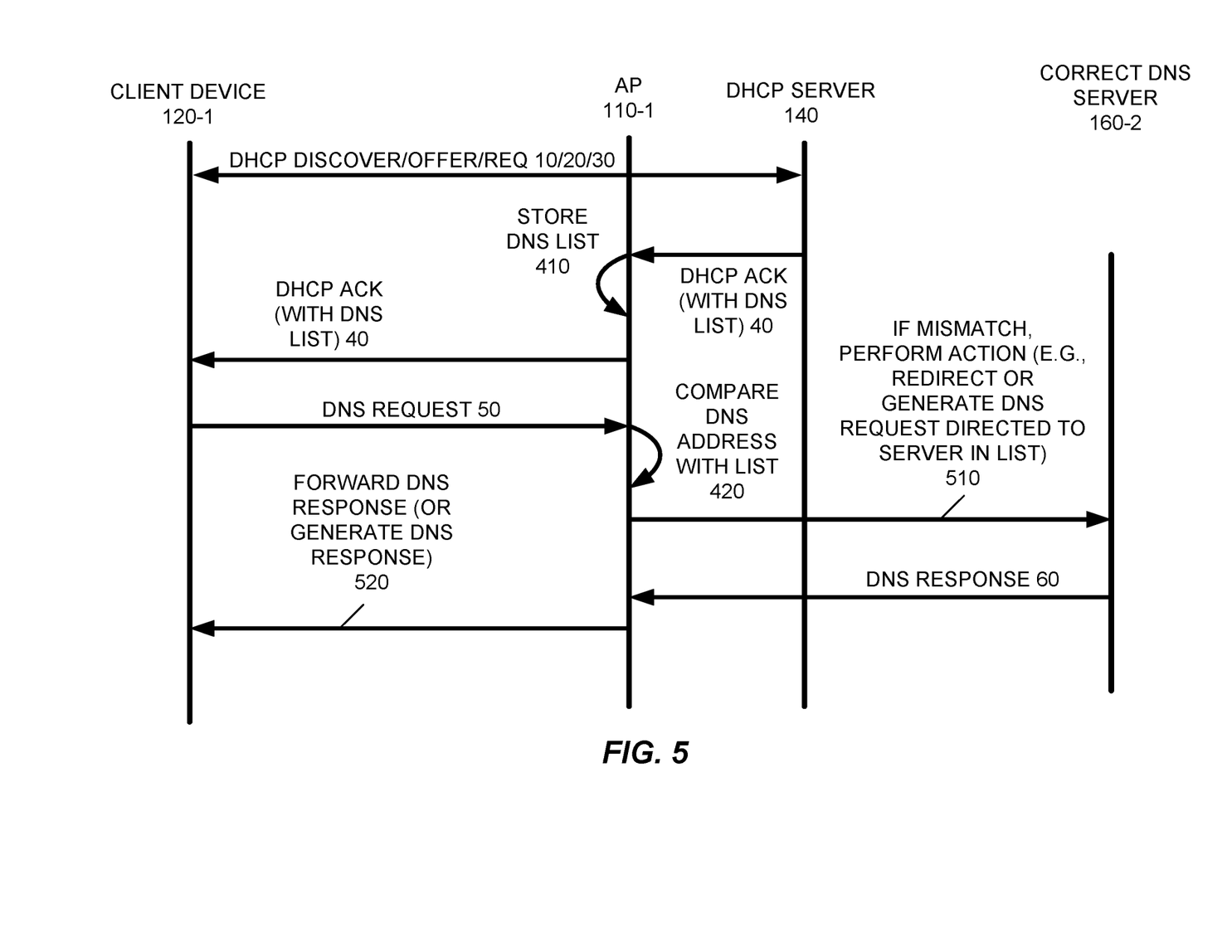
FIG. 5 is a communication diagram providing an example embodiment according to the present disclosure in which communication between a client device and a desired DNS server can be provided despite misconfiguration of the client device.

FIG. 5 is a communication diagram providing an example embodiment according to the present disclosure in which communication between a client device and a desired DNS server can be provided despite misconfiguration of the client device. FIG. 5 provides another example of an action that can be performed when the access point 110-1 identifies that the destination address of the DNS request 50 does not match the stored list of the DNS servers. Reference is made to the above description of FIG. 4, and duplicative description of common elements is omitted herein in the interest of brevity.

As can be seen in FIG. 5 at operation 510, if the destination address of the DNS request 50 does not match the stored list of the DNS servers, the access point 110-1 may redirect the DNS request 50 to a server from the stored list of DNS servers. For example, the access point 110-1 may select a server from the stored list of DNS servers (the first server from the list, a random server from the list, etc.) The access point 110-1 may replace the destination address of the DNS request 50 received from the client device 120-1 (i.e., a destination IP address that does not match any of the servers in the stored list of DNS servers) with the address of the selected DNS server (e.g., correct DNS server 160-2). The access point 110-1 may then transmit the modified DNS request in the network toward the selected DNS server 160-2 (operation 510 of FIG. 5).

The access point 110-1 may receive, from the selected DNS server 160-2, a DNS response 60, and may forward the DNS response 60 to the client device 120-1. In some embodiments, the access point 110-1 may replace the source address of the DNS response 60 (i.e., the address of the selected DNS server 160-2 that handed the DNS request) with the replaced original destination address from the original DNS request 50 transmitted by the client device 120-1 (i.e., the destination IP address that does not match any of the servers in the stored list of DNS servers). This replacement scheme may provide relatively seamless handling of a misconfigured client device 120-1, resulting in the client device 120-1 assuming that the request was handled by a DNS server 160-1 at the original destination address, when in actuality the request was handled by a DNS server 160-2 identified in the DHCP ACK message 40.

In some embodiments, rather than replace and forward the destination address of the DNS request 50, the access point 110-1 may generate a second DNS request 50 and transmit the second DNS request to the selected DNS server 160-2. For example, the access point 110-1 may extract the contents (e.g., the domain name) from the first (original) DNS request 50 from the client device 110-1, and may then generate and transmit the second DNS request 50. In some embodiments, the source address of the second DNS request 50 may be the IP address of the access point 110-1. In some embodiments, the source address of the second DNS request 50 may be the IP address of the client device 120-1 (e.g., the access point 110-1 may generate a spoofed DNS request 50).

The access point 110-1 may receive, from the selected DNS server 160-2, a DNS response 60 responsive to the second DNS request 50, and based on the received DNS response 60, the access point 110-1 may generate a second DNS response 60 that is responsive to the original DNS request 50 from the client device 110-1. In some embodiments, the access point 110-1 may indicate that the source address of the generated second DNS response 60 is the destination address from the original DNS request 50 transmitted by the client device 120-1 (i.e., the destination IP address that does not match any of the servers in the stored list of DNS servers). This DNS request and response generation scheme may provide relatively seamless handling of a misconfigured client device 120-1, resulting in the client device 120-1 assuming that the request was handled by a DNS server 160-1 at the original destination address, when in actuality the request was handled by a DNS server 160-2 identified in the DHCP ACK message 40.

Referring back to FIG. 3, the wireless network 102 may be a WLAN that may include a plurality of access points 110. The access points 110 may provide access to the WLAN throughout a limited area (e.g., within a home, school, store, campus, shopping mall, etc.). A portable client device 120 can be moved throughout the area covered by the WLAN and remain connected to the network. A core feature of the WLAN may include roaming, such as WiFi roaming. Roaming may occur when a portable client device 120-1 moves outside the usable range of a first access point 110-1 and connects to a second access point 110-2 (typically through a reassociation process). The portable client device 120-1 may switch from the first access point 110-1 to as needed to provide relatively seamless connectivity. Since the portable client device 120-1 has not left the WLAN the portable client device 120-1 may retain the same IP address and lease duration and may not contact the DHCP server 140 upon association or connection with the second access point 110-2.

Figure 6:
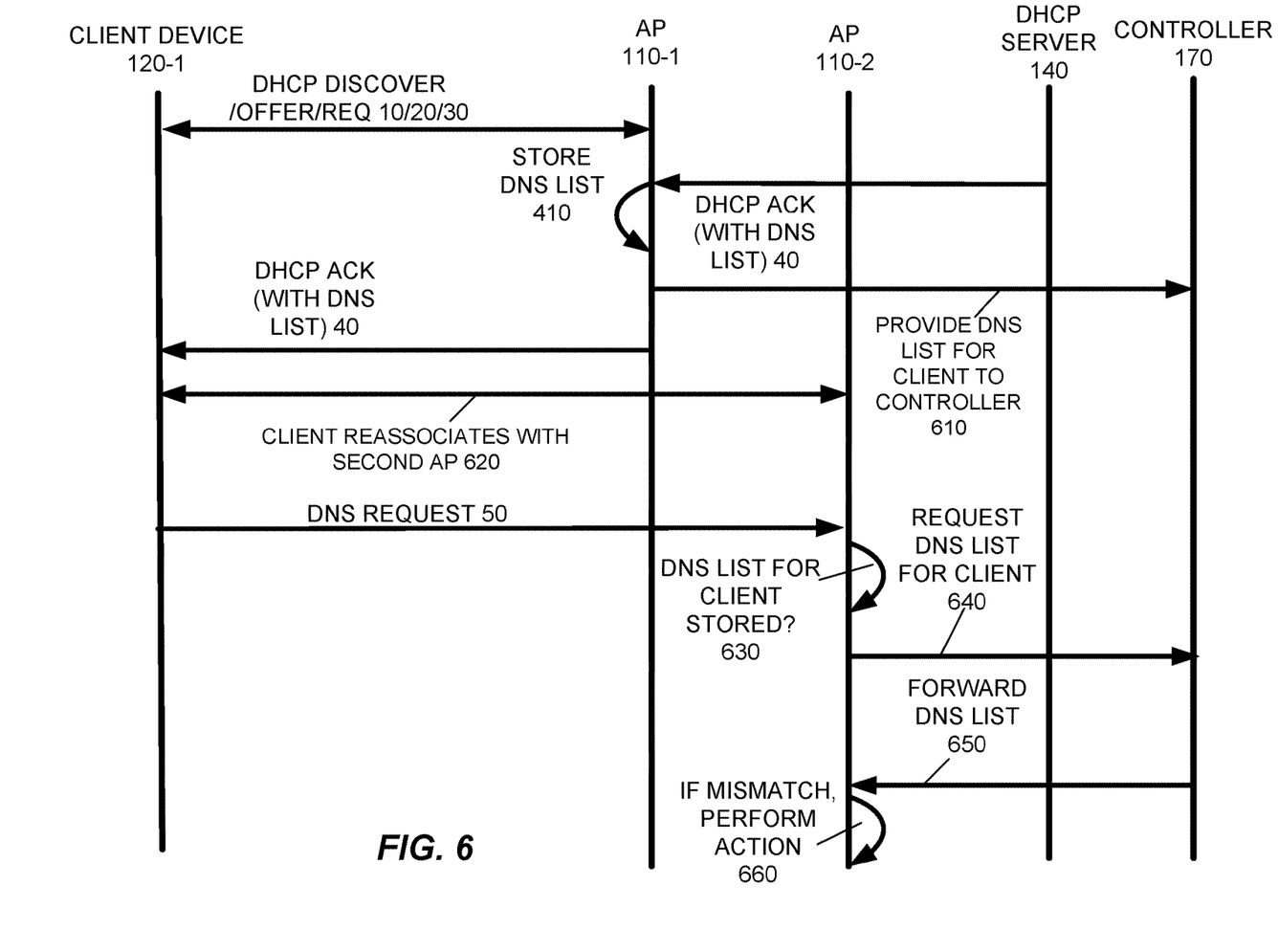
FIG. 6 is a communication diagram providing an example embodiment according to the present disclosure in which computer networking devices in a network may cooperatively provide detection and solution of misconfigured DNS requests.

Although useful, the roaming discussed above may frustrate the DNS mismatch detection and action mechanisms discussed above with respect to FIGS. 4 and 5. For example, the second access point 110-2 may not receive a DHCP ACK message directed to a client device 120-1 that has roamed to the second access point 110-2, and as a result the second access point 110-2 may receive a DNS request 50 from the client device 120-1 but may not have a stored list of DNS servers associated with the client device 120-1. To address this, aspects of the present disclosure provide that computer networking devices in a network may cooperatively provide detection and solution of misconfigured DNS requests. FIG. 6 is a communication diagram providing an example embodiment according to the present disclosure in which computer networking devices in a network provide such cooperation.

As can be seen in FIG. 6, a client device 120-1 may associate and communicate with a first access point 110-1. The first access point 110-1 may identify a DHCP ACK message 40 that is being communicated to the client device 120-1 via the first access point 110-1. The first access point 110-1 may examine the contents of the DHCP ACK message 40 and extract from the DHCP ACK message 40 a list of DNS servers, if present. The first access point 110-1 may then store the list of DNS servers in association with the client device 120-1 (operation 410 of FIG. 6). In addition, the first access point 110-1 may transmit the list of DNS servers to a controller 170 (operation 610 of FIG. 6).

Subsequently, the client device 120-1 may move from a coverage area of the first access point 110-1 to a coverage area of a second access point 110-2, and the client device may roam to and associate (reassociate) with the second access point 110-2 (operation 620 of FIG. 6). When a later DNS request 50 is received from the client device 120-1, the second access point 110-2 may detect that the second access point 110-2 does not have a stored local list of DNS servers associated with the client device 120-1 (operation 630 of FIG. 6), and may request and/or retrieve the DNS list for the client device 120-1 from the controller 170 (operation 640 of FIG. 6). The controller 170 may forward the DNS list associated with the client device 120-1 to the second access point 110-2 (operation 650 of FIG. 6). The second access point 110-2 may then compare the destination address of the DNS request with the stored list of DNS servers (see operation 420 of FIGS. 4 and 5). If the destination address of the DNS request 50 does not match the stored list of the DNS servers, the access point 110-1 may perform one or more actions (operation 660 of FIG. 4), such as sending a notification to an administrative user (FIG. 4) or generating or modifying a DNS request (FIG. 5).

In some embodiments, the second access point 110-2 may request or retrieve the list of DNS servers associated with the client device 120-1 from the controller 170 upon the association of the client device 120-1 with the second access point 110-2.

Figure 7:
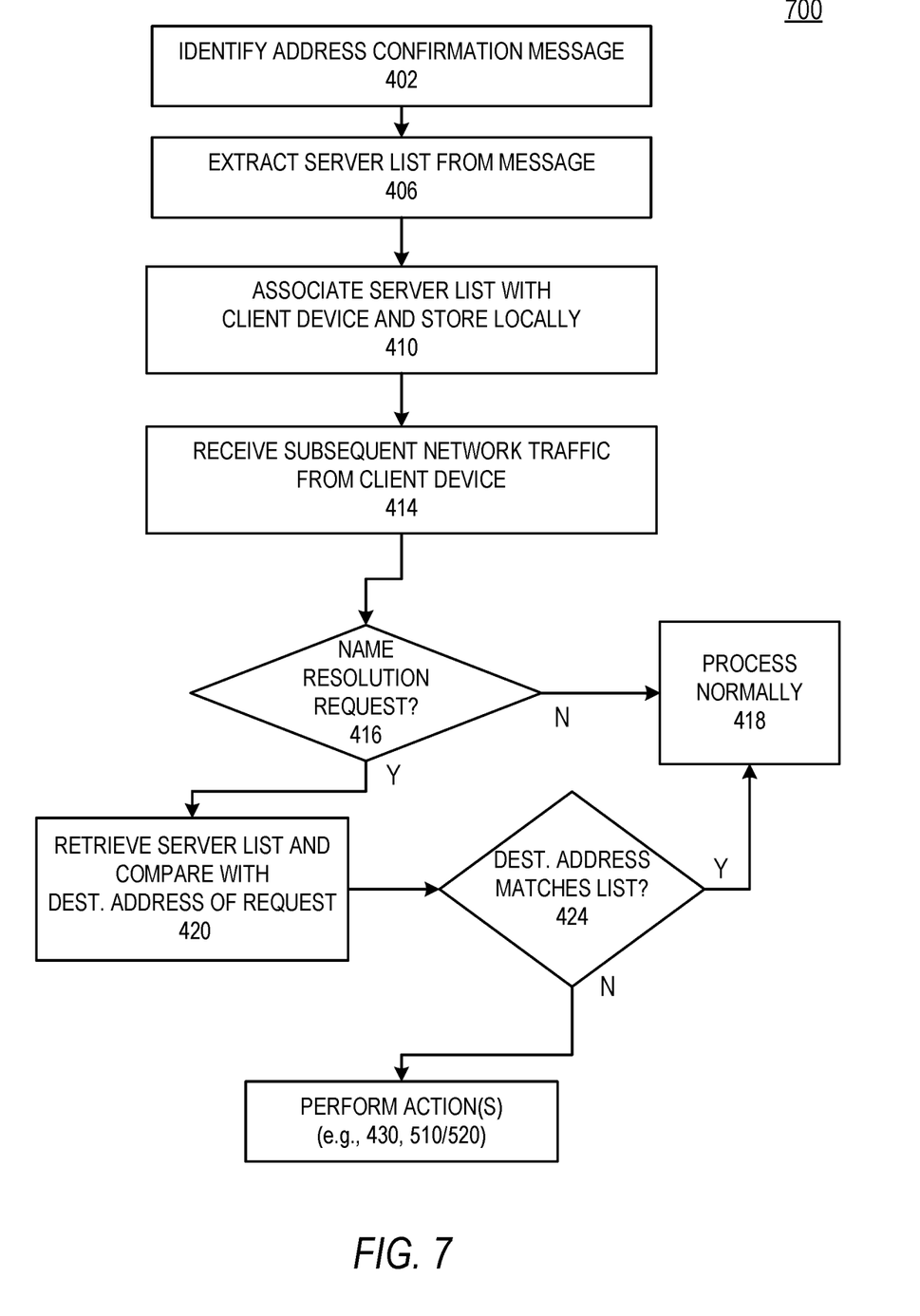
FIGS. 7, 8A, and 8B are a flow diagram of identifying a potential DNS misconfiguration of a client device based on a DNS request message failing to match a list of DNS servers and performing one or more actions in response to the identification, according to some embodiments of the present disclosure.
Figure 8A:
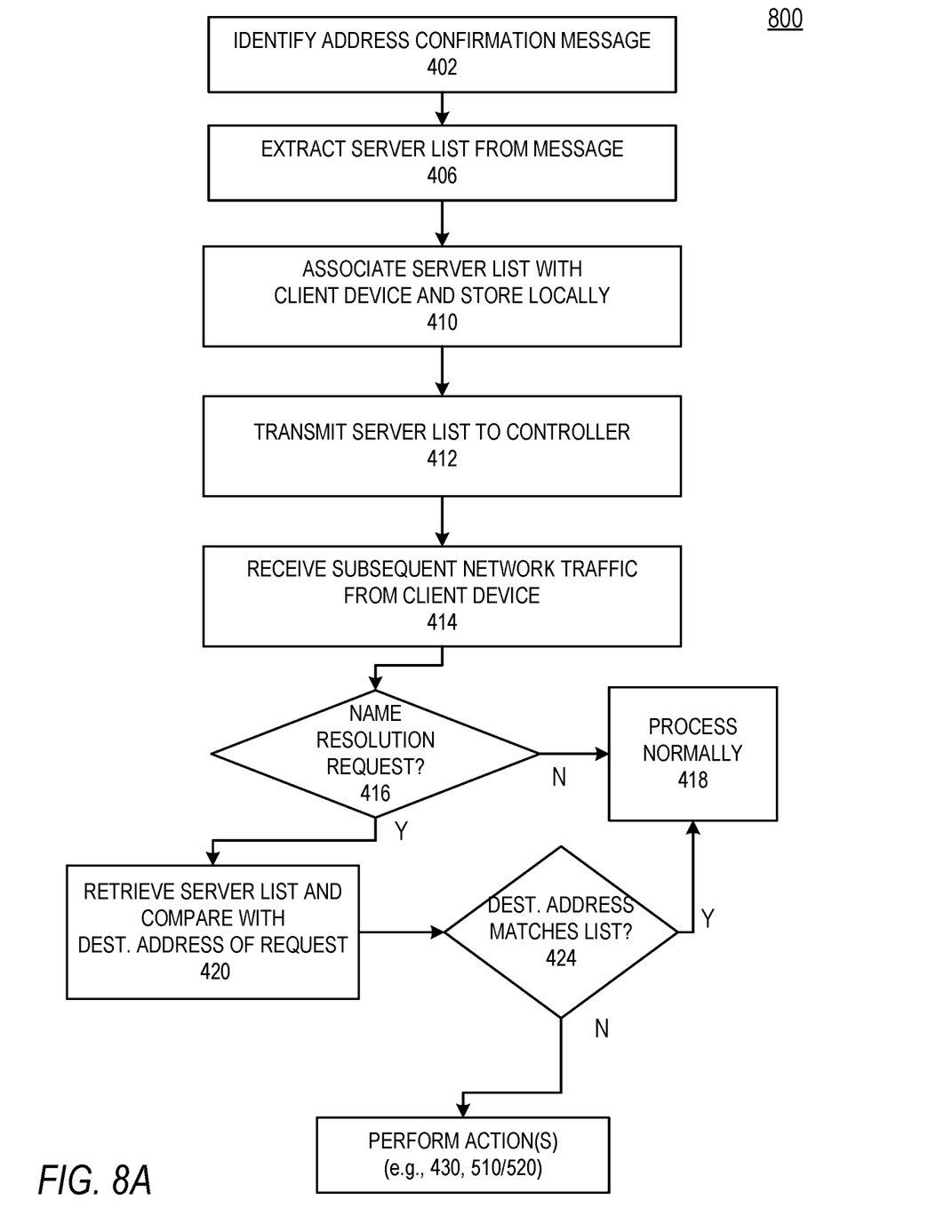
Figure 8B:
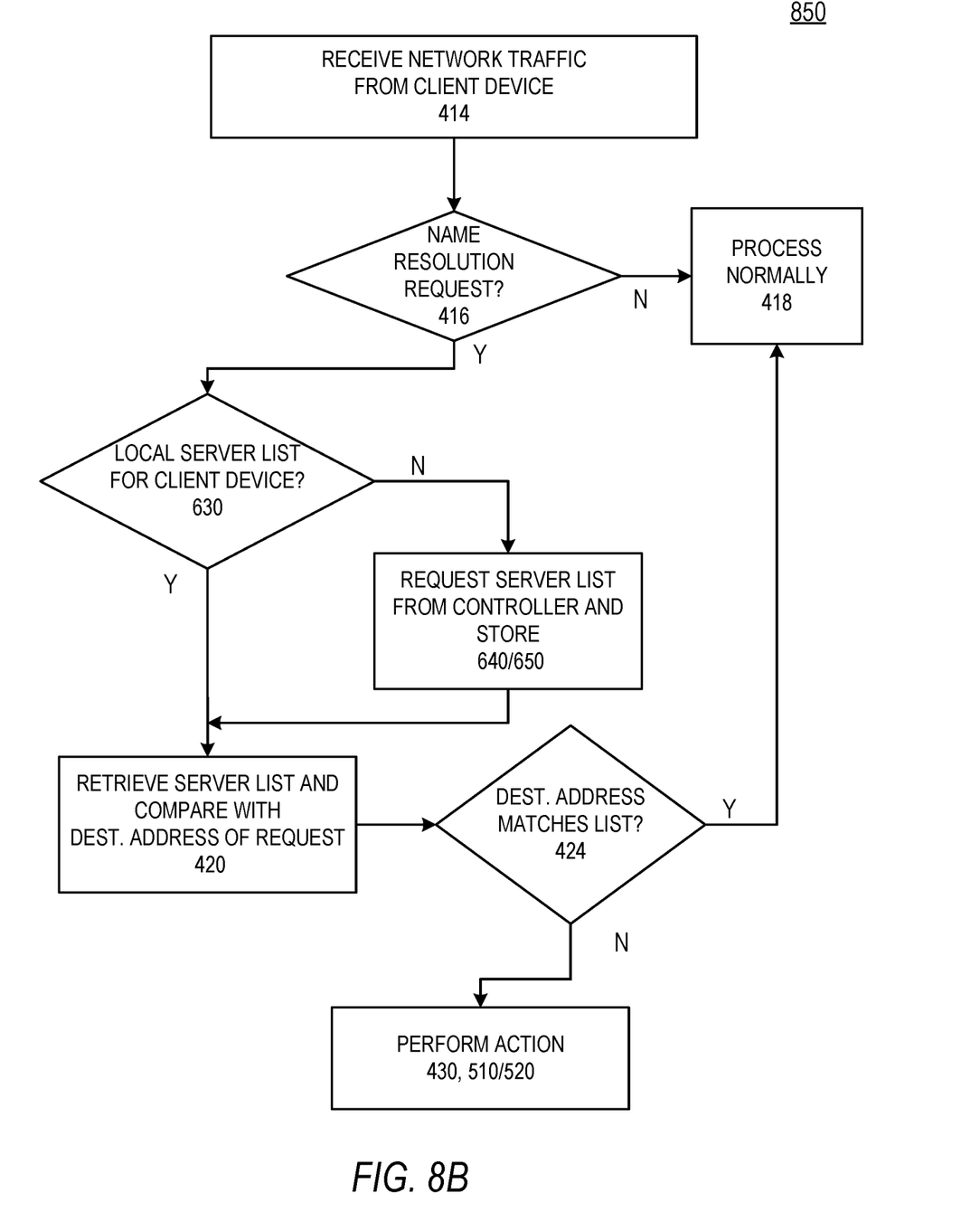

FIGS. 7, 8A, and 8B are a flow diagram of identifying a potential DNS misconfiguration of a client device based on a DNS request message failing to match a list of DNS servers and performing one or more actions in response to the identification, according to some embodiments of the present disclosure. Referring first to FIG. 7, and with reference to FIGS. 4 and 5, in some embodiments, a method 700 of identifying a potential DNS misconfiguration of a client device based on a DNS request message failing to match a list of DNS servers and performing one or more actions in response to the identification may include identifying, by a computer networking device (e.g., access point 110, switch 130), a message that confirms a network address (e.g., DHCP ACK message 40) is assigned to a client device (e.g., client device 120) in communication with the computer networking device (block 402 of FIG. 7). The message may be an acknowledgement message transmitted by a server configured to assign network addresses in a network (e.g., DHCP server 140). The computer networking device may extract from the message a list of servers (e.g., DNS servers 160) indicating servers to which the client device 120 is to communicate name resolution messages (e.g., DNS request 50) (block 406 of FIG. 7). The list of servers may be a list of IP addresses.

The computer networking device may associate the list of servers with the client device (e.g., with an identifier of the client device), and may store the server list locally (block 410 of FIG. 7). The computer networking device may receive subsequent network traffic from the client device (block 414 of FIG. 7). The computer networking device may determine or decide whether the subsequent network traffic includes a name resolution request (block 416 of FIG. 7). If the subsequent network traffic does not include a name resolution request ("N" branch from block 416), the computer networking device may process the subsequent network traffic normally (block 418).

If the subsequent network traffic does include a name resolution request ("Y" branch from block 416), the computer networking device may retrieve the server list and compare a destination address of the subsequent network traffic with the server list (block 420, 424 of FIG. 7). If the destination address of the subsequent network traffic matches with a server on the server list ("Y" branch from block 424), then the computer networking device may process the subsequent network traffic normally (block 418) (i.e., may forward the subsequent network traffic towards the matched server from the server list). If the destination address of the subsequent network traffic does not match with a server on the server list ("N" branch from block 424), then the computer networking device may perform one or more actions, such as sending a notification to an administrative user (discussed above with reference to FIG. 4) or generating or modifying a DNS request (discussed above with reference to FIG. 5). The computer networking device may continue to process additional network traffic from the client device 120.

Referring now to FIGS. 8A and 8B, and with reference to FIG. 6, method 800 of FIG. 8A is similar to method 700 of FIG. 7, with the addition that the computer networking device may transmit the server list extracted from the acknowledgement message to the controller 170 (block 412 of FIG. 8A). In FIG. 8B and method 850 thereof, network traffic may be received at a computer networking device from a client device in communication with the computer networking device (block 414 of FIG. 8B). The computer networking device may determine or decide whether the subsequent network traffic includes a name resolution request (block 416 of FIG. 7). If the subsequent network traffic does not include a name resolution request ("N" branch from block 416), the computer networking device may process the subsequent network traffic normally (block 418).

If the subsequent network traffic does include a name resolution request ("Y" branch from block 416), the computer networking device may determine or detect whether the computer networking device has a local server list associated with the client device (block 630). If the computer networking device does not have a local server list associated with the client device ("N" branch from operation 630), the computer networking device may request or retrieve a copy of the server list from the controller 170 and store the retrieved or received copy locally (block 640/650). If the computer networking device does have a local server list associated with the client device ("Y" branch from operation 630), or once the computer networking device does have a local server list associated with the client device, the computer networking device may retrieve or use the server list and compare a destination address of the subsequent network traffic with the server list (block 420, 424 of FIG. 7). If the destination address of the subsequent network traffic matches with a server on the server list ("Y" branch from block 424), then the computer networking device may process the subsequent network traffic normally (block 418) (i.e., may forward the subsequent network traffic towards the matched server from the server list). If the destination address of the subsequent network traffic does not match with a server on the server list ("N" branch from block 424), then the computer networking device may perform one or more actions, such as sending a notification to an administrative user (discussed above with reference to FIG. 4) or generating or modifying a DNS request (discussed above with reference to FIG. 5).

Figure 9:
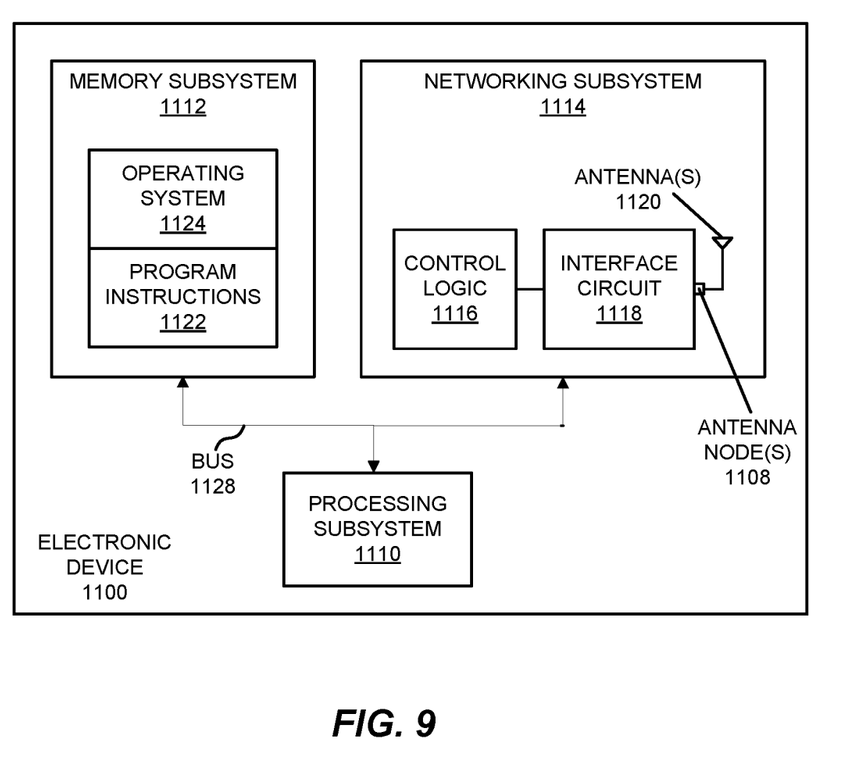
FIG. 9 is a block diagram illustrating an example of an electronic device according to some embodiments of the present disclosure.

FIG. 9 is a block diagram illustrating an electronic device 1100 in accordance with some embodiments. The electronic device 1100 may be, for example, one or more computer networking devices 110/130 (e.g., access points 110, network switches 130), client devices 120, controller 170, network edge device 190, DHCP server 140 and/or DNS server 160 illustrated in FIG. 3. The electronic device 1100 includes a processing subsystem 1110, a memory subsystem 1112, and a networking subsystem 1114. Processing subsystem 1110 includes one or more devices configured to perform computational operations. Memory subsystem 1112 includes one or more devices for storing data and/or instructions. In some embodiments, the instructions may include an operating system and one or more program modules which may be executed by processing subsystem 1110.

Networking subsystem 1114 includes one or more devices configured to couple to and communicate on a wired and/or wireless network (i.e., to perform network operations), including: control logic 1116, an interface circuit 1118 and one or more antennas 1120 (or antenna elements). While FIG. 9 includes an antenna 1120, in some embodiments electronic device 1100 includes one or more nodes, such as nodes 1108, e.g., a connector, which can be coupled to one or more antennas 1120 that are external to the electronic device 1100. Thus, electronic device 1100 may or may not include the one or more antennas 1120. Networking subsystem 1114 includes at least a networking system based on the standards described in IEEE 802.11 (e.g., a Wi-Fi networking system).

Networking subsystem 1114 includes processors, controllers, radios/antennas, sockets/plugs, and/or other devices used for coupling to, communicating on, and handling data and events for each supported networking system. Note that mechanisms used for coupling to, communicating on, and handling data and events on the network for each network system are sometimes collectively referred to as a 'network interface' for the network system. Moreover, in some embodiments a 'network' or a 'connection' between the electronic devices does not yet exist. Therefore, electronic device 1100 may use the mechanisms in networking subsystem 1114 for performing simple wireless communication between the electronic devices, e.g., transmitting frames and/or scanning for frames transmitted by other electronic devices.

Processing subsystem 1110, memory subsystem 1112, and networking subsystem 1114 are coupled together using bus 1128. Bus 1128 may include an electrical, optical, and/or electro-optical connection that the subsystems can use to communicate commands and data among one another.

Electronic device 1100 can be (or can be included in) any electronic device with at least one network interface. For example, electronic device 1100 can be (or can be included in): a desktop computer, a laptop computer, a subnotebook/netbook, a server, a computer, a mainframe computer, a cloud-based computer, a tablet computer, a smartphone, a cellular telephone, a smartwatch, a wearable device, a consumer-electronic device, a portable computing device, an access point, a transceiver, a controller, a radio node, a router, a switch, communication equipment, a wireless dongle, test equipment, and/or another electronic device.

The operations performed in the communication techniques according to embodiments of the present disclosure may be implemented in hardware or software, and in a wide variety of configurations and architectures. For example, at least some of the operations in the communication techniques may be implemented using program instructions 1122, operating system 1124 (such as a driver for interface circuit 1118) or in firmware in interface circuit 1118. Alternatively or additionally, at least some of the operations in the communication techniques may be implemented in a physical layer, such as hardware in interface circuit 1118.

Embodiments of the present disclosure have been described above with reference to the accompanying drawings, in which embodiments of the disclosure are shown. The inventive concepts may, however, be embodied in many different forms and should not be construed as limited to the embodiments set forth herein. Rather, these embodiments are provided so that this disclosure will be thorough and complete, and will fully convey the scope of the disclosure to those skilled in the art. Like numbers refer to like elements throughout.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present disclosure. As used herein, the term "and/or" includes any and all combinations of one or more of the associated listed items.

It will be understood that when an element is referred to as being "on" another element, it can be directly on the other element or intervening elements may also be present. In contrast, when an element is referred to as being "directly on" another element, there are no intervening elements present. It will also be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (i.e., "between" versus "directly between", "adjacent" versus "directly adjacent", etc.).

Relative terms such as "below" or "above" or "upper" or "lower" or "horizontal" or "vertical" may be used herein to describe a relationship of one element, layer or region to another element, layer or region as illustrated in the figures. It will be understood that these terms are intended to encompass different orientations of the device in addition to the orientation depicted in the figures.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" "comprising," "includes" and/or "including" when used herein, specify the presence of stated features, operations, elements, and/or components, but do not preclude the presence or addition of one or more other features, operations, elements, components, and/or groups thereof.

Aspects and elements of all of the embodiments disclosed above can be combined in any way and/or combination with aspects or elements of other embodiments to provide a plurality of additional embodiments.

What is claimed is:
1. A method comprising:
identifying, by a computer networking device, a message confirming that a network address is assigned to a client device communicatively coupled with the computer networking device;
extracting, from the message, a list of addresses indicating servers to which the client device is to communicate name resolution requests;
storing the list of addresses;
receiving subsequent network traffic from the client device including a name resolution request;

comparing a destination address from the name resolution request with the list of addresses; and performing, by the computer networking device, one or more actions when the destination address does not match any of the addresses from the list of addresses.

2. The method of claim 1, wherein the performing of the one or more actions comprises transmitting a notification.

3. The method of claim 1, wherein the name resolution request is a first name resolution request having a first destination address, and wherein the performing of the one or more actions comprises generating a second name resolution request having a second destination address that matches one of the addresses of the list of addresses.

4. The method of claim 3, further comprising:
transmitting the second name resolution request toward the second destination address;
receiving a response to the second name resolution request; and
generating a response to the first name resolution request based on the response to the second name resolution request.

5. The method of claim 1, wherein the performing of the one or more actions comprises replacing the destination address of the name resolution request with an address from the list of addresses.

6. The method of claim 1, further comprising:
transmitting a copy of the list of addresses indicating servers to a controller that controls the computer networking device.

7. The method of claim 1, wherein the message confirming that the network address is assigned to the client device is a Dynamic Host Configuration Protocol (DHCP) message.

8. The method of claim 1, wherein the list of addresses indicating the servers to which the client device is to communicate name resolution requests is a list of addresses of Domain Name System (DNS) servers.

9. The method of claim 1, wherein the computer networking device is a wireless access point.

10. A method comprising:
identifying, by a first computer networking device, a message confirming that a network address is assigned to a client device communicatively coupled with the first computer networking device;
extracting, from the message, a list of addresses indicating servers to which the client device is to communicate name resolution requests;
transmitting the list of addresses from the first computer networking device to a controller;
receiving, at a second computer networking device, subsequent network traffic from the client device including a name resolution request;
transmitting the list of addresses from the controller to the second computer networking device;
comparing, by the second computer networking device, a destination address from the name resolution request with the list of addresses; and
performing, by the second computer networking device, one or more actions when the destination address does not match any of the addresses from the list of addresses.

11. The method of claim 10, wherein the name resolution request is a first name resolution request having a first destination address, and wherein the performing of the one or more actions comprises generating a second name resolution request having a second destination address that matches one of the addresses of the list of addresses.

12. The method of claim 11, further comprising:
transmitting the second name resolution request toward the second destination address;
receiving a response to the second name resolution request; and
generating a response to the first name resolution request based on the response to the second name resolution request.

13. The method of claim 10, wherein the performing of the one or more actions comprises replacing the destination address of the name resolution request with an address from the list of addresses.

14. A method comprising:
receiving, by a computer networking device, network traffic from a client device including a first name resolution request;
comparing a first destination address from the first name resolution request with a list of addresses indicating servers to which the client device is to communicate name resolution requests;
detecting that the first destination address from the first name resolution request does not match any of the addresses from the list of addresses;
extracting a domain name to be resolved from the first name resolution request; and
generating a second name resolution request comprising the domain name to be resolved and a second destination address that matches one of the addresses of the list of addresses.

15. The method of claim 14, further comprising:
transmitting the second name resolution request toward the second destination address;
receiving a response to the second name resolution request; and
generating a response to the first name resolution request based on the response to the second name resolution request.

16. The method of claim 15, wherein the generated response to the first name resolution request includes the first destination address as a source address.

17. The method of claim 14, wherein the list of addresses indicating the servers to which the client device is to communicate name resolution requests is a list of addresses of Domain Name System (DNS) servers.

18. The method of claim 14, wherein the computer networking device is a wireless access point.

19. The method of claim 14, wherein the list of addresses indicating servers to which the client device is to communicate name resolution requests is extracted from a Dynamic Host Configuration Protocol (DHCP) message.

20. The method of claim 19, further comprising:
transmitting, to a controller that controls the computer networking device, a copy of the list of addresses indicating servers to which the client device is to communicate name resolution requests.

* * * * *